United States Patent Office

3,020,125
Patented Feb. 6, 1962

3,020,125
PROCESS OF MAKING SODIUM METASILICATE
David J. Eisenberg, Oak Park, and Thomas Mauthner, Detroit, Mich., assignors to Nelson Chemicals Co., Detroit, Mich.
No Drawing. Filed Nov. 10, 1958, Ser. No. 772,715
10 Claims. (Cl. 23—110)

This invention relates to improvements in processes for making sodium metasilicate from sodium subsilicate containing a higher molecular ratio of $Na_2O$ to $SiO_2$ than the metasilicate, by reaction with liquid water glass. Further, it relates to processes for making anhydrous sodium metasilicate from sodium subsilicates containing a higher ratio of $Na_2O$ to $SiO_2$ than the metasilicate, in a single reaction vessel, without requiring the use of high temperature furnaces, driers, crystallizers, or other expensive equipment.

PRIOR ART

The principal method of producing sodium metasilicate is the "fusion method." In the fusion method, sodium carbonate and silica are heated together in a continuous tank furnace of the glass-melting type to a temperature substantially above the fusion point of the system (that is, to a temperature substantially above that of the resulting sodium metasilicate, about 1088° C.). The fused product, after solidifying, is dissolved in water, and is then corrected to the proper $Na_2O:SiO_2$ ratio by the addition of sodium hydroxide or water glass, as required. The solution is then concentrated by evaporation, and the sodium metasilicate is removed by crystallization. The crystals are then dried and comminuted.

The chief advantage of the "fusion" method is the ease and completeness of reaction, due to the fluidity of the liquid reaction mass, and to the very high reaction temperature. Because of this, it is possible to produce the metasilicate, as well as other subsilicates. Furthermore, there is no difficulty in producing an anhydrous product. On the other hand, this method suffers from the very serious disadvantages of extremely high cost of plant and equipment, high repair charges due to the slagging effect on furnace linings, high consumption of fuel necessary to reach and maintain the operating temperatures, and the cost of evaporation and drying the product.

An alternative method of producing sodium metasilicate is the "wet digestion" process. In this process, water glass or silica is digested with a concentrated solution of caustic soda, with the application of external heat, in order to keep the reaction product in the liquid state. The reaction proceeds until sodium metasilicate is produced in solution. The solution is then treated in substantially the same way as described above in connection with the fusion method, i.e. evaporation, crystallization, drying, and comminution. Thus, this process embodies many of the disadvantages of the fusion method.

Other processes for producing alkali subsilicates without liquifying the entire reaction mass, fail to produce sodium metasilicate, e.g. the 1937 Burkhart-Riggs process (U.S. 2,083,545, Re. 21,703), and the 1937 Davies process (U.S. 2,100,944, Re. 22,951).

In view of the difficulty experienced in the prior processes of making sodium metasilicate, a process was introduced by Riggs and Burkhart in 1939 (U.S. 2,175,-781), in which sodium subsilicate containing a high ratio of $Na_2O$ to $SiO_2$ than the metasilicate (e.g. sodium sesquisilicate) is reacted with a liquid water glass solution in stoichiometric proportion, without external heating. The reaction mass comprises a solid-liquid paste which heats up to about 85° C. during the reaction, due to the exothermic heat of reaction. The product gradually cools, and solidifies as a hydrated sodium metasilicate. This can subsequently be converted to the anhydrous compound by passing it through a dryer at 200 to 400° C. This process is especially advantageous when hydrated compounds are desired, since in that case, no evaporation, crystallization, or drying equipment is required. It is less advantageous, however, when an anhydrous product is to be produced, as separate drying equipment is then required, with concomitant high fuel costs.

PRESENT STATE OF THE ART

Thus, at present, there remains a problem of producing high purity anhydrous sodium metasilicate by a process which does not require separate equipment for fusion, evaporation, crystallization and drying, and which avoids excessive heating costs.

A fairly close approach to this goal was that of Riggs and Burkhart in 1939 (U.S. 2,175,781). It obtains all the above advantages, except for external drying equipment and excessive heating costs. In said process, the exothermic heat of reaction causes a rise in temperature during the reaction, but this is not taken advantage of in any way. On the contrary, in fact, it simply impedes the cooling process before the hydrated product is discharged, prior to dehydration.

Thus, there is room for an improvement over the 1939 Riggs-Burkhart process, which will eliminate the need for external drying equipment, and which will also take advantage of the exothermic heat of reaction to aid in producing an anhydrous product.

SCOPE OF THE PRESENT INVENTION

The present invention constitutes an improvement over prior processes for producing sodium metasilicate. More particularly, it is an improvement over the 1939 Riggs-Burkhart process (U.S. 2,175,781), since the present method also involves the reaction of a sodium subsilicate containing a higher ratio of $Na_2O$ to $SiO_2$ than the metasilicate, with a liquid water glass solution, in substantially stoichiometric proportion. In general, the improvements described herein (1) permit the production of an anhydrous product without requiring the use of external drying equipment, and (2) reduce the cost of fuel, by taking advantage of the exothermic heat of reaction, to aid in producing an anhydrous product.

OBJECTS

An object of the present invention is to provide a process for the production of sodium metasilicate, without requiring the use of temperatures sufficient to fuse the entire reaction mass.

A second object of the present invention is to provide a process for the production of sodium metasilicate without requiring the use of separate evaporation, crystallization, or drying equipment.

A third object of the present invention is to provide a process for the production of anhydrous sodium metasilicate, without requiring the fusion of the entire reaction mass, while taking advantage of the exothermic heat of reaction, to aid in producing an anhydrous product.

A fourth object of the present invention is to provide a process for the production of sodium metasilicate by the reaction of sodium subsilicate containing a higher ratio of $Na_2O$ to $SiO_2$ than the metasilicate, with a liquid water glass solution, in substantially stoichiometric proportion.

ADVANTAGES

An advantage of the present invention is that it can be carried out in a single reaction vessel.

A second advantage of the present invention is the reduction in cost of the process, due to reduced equipment costs and reduced fuel costs.

A third advantage of the present invention is that the product is highly porous, having low bulk density, high liquid absorptive capacity, and rapid dissolving power.

A fourth advantage of the present invention is that the product is very easily granulated, thus minimizing comminution costs.

Other objects and advantages will more fully appear from the following description of the invention.

DESCRIPTION OF THE INVENTION

(a) *General description*

The present invention is based on the discovery that when solid sodium subsilicate containing a higher ratio of $Na_2O$ to $SiO_2$ than the metasilicate is mixed with a liquid water glass solution with external heating, a bubbling reaction ensues, and the reaction mass is gradually converted to a thick plastic mass, from which the water continues to be evolved upon further heating without agitating, until it forms a white porous solid mass consisting of anhydrous sodium metasilicate.

(b) *The water glass reagent*

The water glass reagent comprises a liquid aqueous solution of a sodium oxide-silica product, in which the molecular ratio of $Na_2O$ to $SiO_2$ is less than 1. Its ratio of $Na_2O$ to $SiO_2$ will determine the amount to be employed in the reaction with a particular sodium subsilicate reagent.

The amount of water contained in the water glass reagent may be any amount desired, since it is removed by evaporation during the process, along with the water formed during the reaction. However, excessive amounts of water should be avoided, in order to avoid undue prolongation of the processing and excessive heating costs.

On the other hand, unless a substantial amount of water is present, excessively high temperatures will be required in order to liquify said water glass solution. Thus, there should be at least enough water to permit said solution to be liquid at a temperature of 100° C., and preferably at ordinary ambient temperatures. We may, for example, use a commercially available 40° Bé. liquid water glass solution containing a weight ratio of $Na_2O$ to $SiO_2$ of about 1 to 3.3.

(c) *The sodium subsilicate reagent*

The sodium subsilicate reagent may comprise any solid reaction product of sodium and silica, containing a higher molecular ratio of $Na_2O$ to $SiO_2$ than the metasilicate, i.e. higher than 1, e.g. sodium sesquisilicate or sodium orthosilicate. The former is preferable as a reagent for the present process, since the amount of the relatively expensive water glass reagent is thereby reduced, as well as the time required for the process and the amount of water formed during the reaction.

If the subsilicate reagent has been freshly prepared, and is therefore hot, it should be allowed to cool down to about 60° C. before use in the present process, so that the reaction will not be violent. If, on the other hand, the subsilicate reagent is initially cold, it need not be preheated, since external heat is supplied during the course of the reaction.

(d) *Reaction procedure*

A mixture of the liquid water glass reagent and the sodium subsilicate reagent, in substantially stoichiometric proportions, is prepared in a reaction vessel, with agitation, and heat is applied. A bubbling reaction ensues, in which steam is evolved. The reaction mass is gradually converted into a thick plastic mass. At this point, the agitator is removed. Heating is continued, however, until no more steam is liberated. The reaction mass then constitutes a solid white mass, which is very easily granulated.

(e) *Example*

By way of illustration and not limitation, the following example illustrates a preferred embodiment of the improved process of our invention.

100 pounds of anhydrous sodium sesquisilicate, and 85 parts of 40° Bé. liquid water glass solution containing 1 part by weight of $Na_2O$ to 3.3 parts by weight of $SiO_2$, were agitated together in a heated stainless steel reaction vessel. As the temperature increased, a bubbling reaction ensued. The reaction mass converted to a thick plastic mass, and the agitator was then removed. Heating was continued until no more steam was liberated. The reaction mass was then a solid white mass, which dropped out easily from the reaction vessel, and was very easily granulated. The product was a porous sodium metasilicate, meeting current specifications for anhydrous sodium metasilicate, and containing 0.4% insolubles.

(f) *Summary*

Thus, by our invention, we have provided an improved method for producing sodium metasilicate from a sodium subsilicate containing a higher $Na_2O:SiO_2$ ratio than the metasilicate, by the addition of liquid water glass, with external heating; said process does not require separate equipment for fusion, evaporation, crystallization, or drying, and avoids excessive heating costs.

The present process differs in procedure from the 1939 Riggs-Burkhart process, in that external heating is supplied during the course of the reaction, whereas in the prior process there was external cooling. It differs in reaction mechanism, in that water is evaporated during the reaction, whereas that does not occur to any important extent in the prior process; it differs further, in this respect, in that "solidification" occurs in the present process during heating, whereas it occurred in the prior process as a result of cooling. It differs in the product produced, in that a porous product of low bulk density is produced, whereas in the prior process non-porous blocks of relatively high bulk density are produced. And it differs in overall result, in that the cost of fuel is reduced because advantage is taken of the exothermic heat of reaction.

The present process differs from the conventional "fusion" process in that the reaction mass is not fused during the course of the reaction. However, by using an aqueous water glass, a liquid reaction matrix is made possible, even though relatively low temperatures may be employed. This method is thus particularly advantageous when a method of evaporating the water in situ is available, as in the present process.

While we have thus described various embodiments of our invention, it is understood that various modifications in the details may be made without departing from the spirit of said invention, the principal novel features of which are set forth below.

Having now fully described our invention, we claim:

1. A process for producing a porous, low bulk density sodium metasilicate, comprising: admixing in a reaction zone at a temperature below about 60° C. in substantially stoichiometric proportion a sodium subsilicate containing a ratio of $Na_2O$ to $SiO_2$ greater than 1, and an aqueous liquid solution of water glass in which the molecular ratio of $Na_2O$ to $SiO_2$ is less than 1, said water glass solution containing sufficient water to be liquid at temperatures below about 100° C.; agitating and heating said mixture to a temperature sufficient to cause a bubbling reaction to ensue, while allowing the escape of steam from said reaction zone; continuing the heating until a thick plastic mass forms, while allowing the escape of steam from said reaction zone, the maximum temperature being at all times below the fusion point of the reaction mixture; and then discharging the resulting sodium metasilicate from said reaction zone.

2. The process set forth in claim 1, wherein said sodium subsilicate comprises sodium orthosilicate.

3. The process set forth in claim 1, where said sodium subsilicate comprises sodium sesquisilicate.

4. The process set forth in claim 1, wherein said sodium subsilicate is selected from the group consisting of sodium orthosilicate, sodium sesquisilicate, and mixtures thereof.

5. The process set forth in claim 1, wherein said water glass solution contains sufficient water to be liquid at ambient temperature.

6. A process for producing a porous, low bulk density anhydrous sodium metasilicate, comprising: admixing in a reaction zone at a temperature below about 60° C. in substantially stoichiometric proportion a sodium subsilicate containing a ratio of $Na_2O$ to $SiO_2$ greater than 1, and an aqueous liquid solution of a water glass in which the molecular ratio of $Na_2O$ to $SiO_2$ is less than 1, said water glass solution containing sufficient water to be liquid at temperatures below about 100° C.; agitating and heating said mixture to a temperature sufficient to cause a bubbling reaction to ensue, while allowing the escape of steam from said reaction zone; continuing the heating until a thick plastic mass forms while allowing the escape of steam from said reaction zone; continuing further the heating until the evolution of steam substantially ceases, the maximum temperature being at all times below the fusion point of the reaction mixture; and then discharging the resulting anhydrous sodium metasilicate from said reaction zone.

7. The process set forth in claim 6, wherein said sodium subsilicate comprises sodium orthosilicate.

8. The process set forth in claim 6, wherein said sodium subsilicate comprises sodium sesquisilicate.

9. The process set forth in claim 6, wherein said sodium subsilicate is selected from the group consisting of sodium orthosilicate, sodium sesquisilicate, and mixtures thereof.

10. The process set forth in claim 6, wherein said water glass solution contains sufficient water to be liquid at ambient temperature.

References Cited in the file of this patent
UNITED STATES PATENTS

| | | |
|---|---|---|
| 1,922,832 | Westbrook | Aug. 15, 1933 |
| 2,100,944 | Davies | Nov. 30, 1937 |
| 2,175,781 | Riggs et al. | Oct. 10, 1939 |